(12) United States Patent
Misuda

(10) Patent No.: US 8,781,241 B2
(45) Date of Patent: Jul. 15, 2014

(54) IMAGE ENCODING DEVICE ENCODING AN IMAGE BY PERFORMING SEQUENTIAL PROCESSING, METHOD FOR ENCODING IMAGE, AND COMPUTER-READABLE STORAGE MEDIUM STORING IMAGE ENCODING PROGRAM

(75) Inventor: Yasuo Misuda, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 13/410,874

(22) Filed: Mar. 2, 2012

(65) Prior Publication Data

US 2012/0224779 A1 Sep. 6, 2012

(30) Foreign Application Priority Data

Mar. 3, 2011 (JP) ................................. 2011-046999

(51) Int. Cl.
*G06K 9/36* (2006.01)
*G06K 9/46* (2006.01)

(52) U.S. Cl.
USPC ........................................................ 382/246

(58) Field of Classification Search
USPC ................. 382/173, 232, 233, 238, 246, 248, 382/250–151; 375/240.12, 240.13, 240.2, 375/240.24–240.27
See application file for complete search history.

(56) References Cited

U.S. PATENT DOCUMENTS

| 6,611,624 B1 * | 8/2003 | Zhang et al. ................... 382/232 |
| 6,636,565 B1 * | 10/2003 | Kim ......................... 375/240.27 |
| 6,891,893 B2 * | 5/2005 | Sullivan et al. .......... 375/240.25 |
| 2006/0126744 A1 * | 6/2006 | Peng et al. ............... 375/240.26 |
| 2010/0054337 A1 | 3/2010 | Miyoshi |
| 2010/0080478 A1 * | 4/2010 | Satou et al. ................... 382/236 |
| 2012/0224779 A1 * | 9/2012 | Misuda ......................... 382/246 |

FOREIGN PATENT DOCUMENTS

| JP | 2000-224584 | 8/2000 |
| JP | 2010-34802 | 2/2010 |
| JP | 2010-62946 | 3/2010 |

* cited by examiner

*Primary Examiner* — Amir Alavi
(74) *Attorney, Agent, or Firm* — Staas & Halsey LLP

(57) ABSTRACT

An image encoding device that encodes an image by performing sequential processing in units of a certain size, the image encoding device includes, a variable-length coding unit that performs variable-length coding on data to be encoded having the certain size in the image; an estimating unit that estimates the number of codes at a time after the variable-length coding using the data to be encoded at a time before the variable-length coding is performed by the variable-length coding unit; and a slice controlling unit that controls division of the image into slices on the basis of a cumulative value of the estimated number of codes.

20 Claims, 19 Drawing Sheets

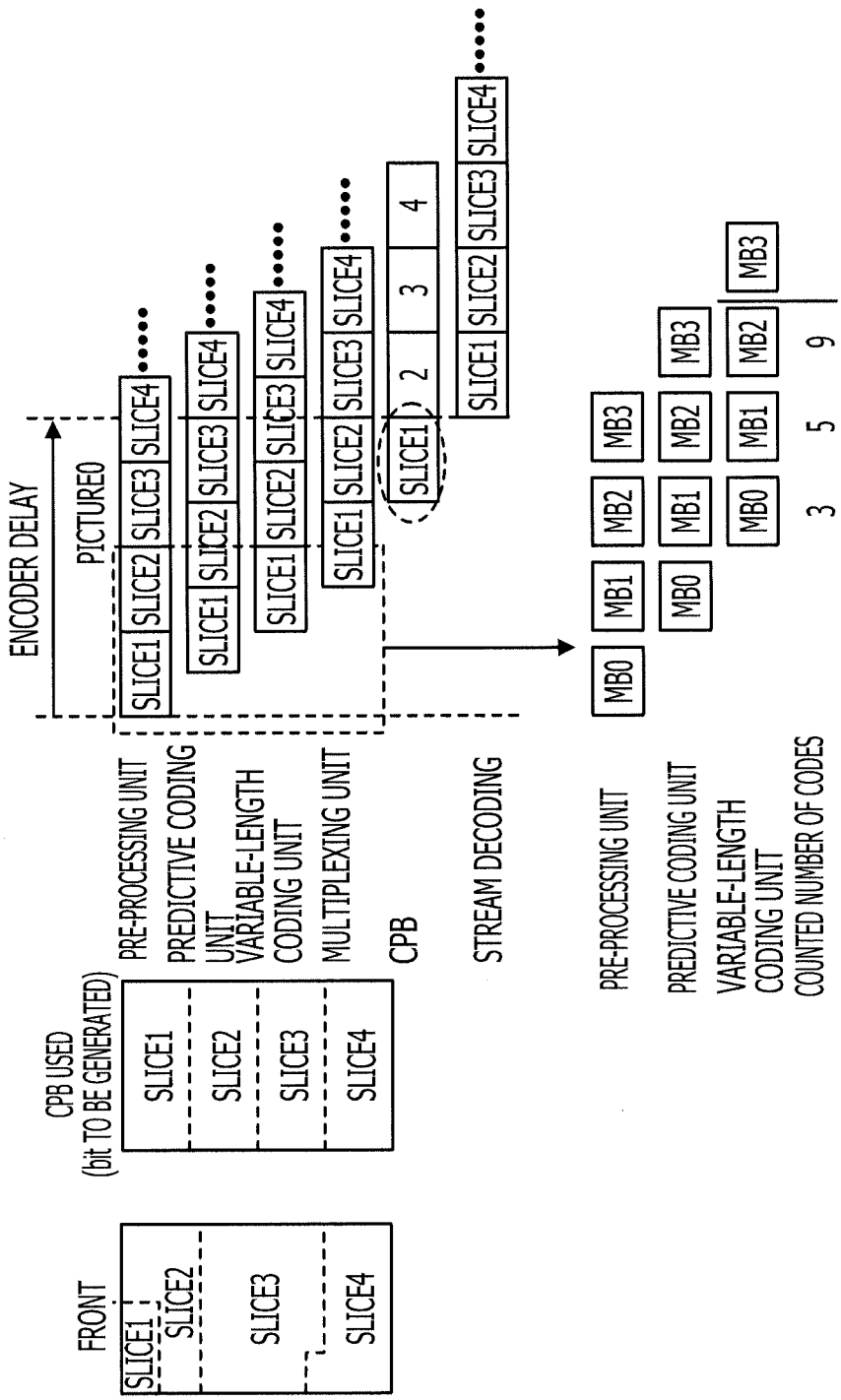

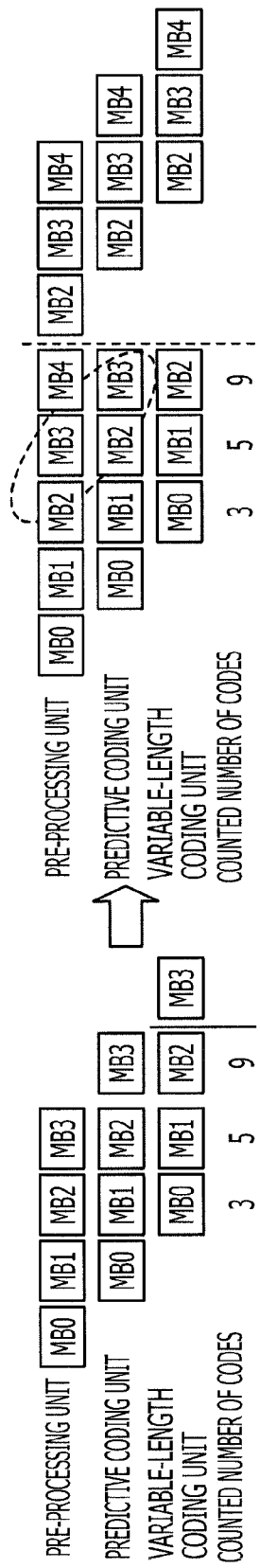

FIG. 14

| | | | | |
|---|---|---|---|---|
| PRE-PROCESSING UNIT | MB0 | MB1 | MB2 | MB3 |
| PREDICTIVE CODING UNIT | | MB0 | MB1 | MB2 | MB3 |
| EXPECTED NUMBER OF CODES | | 3 | 2 | 4 | |
| SUM OF EXPECTED NUMBERS OF CODES | | 3 | 5 | 9 | |
| SUB OF EXPECTED NUMBERS OF CODES AFTER ERROR CORRECTION | | 3 | 5 | 11 | |
| VARIABLE-LENGTH CODING UNIT | | | MB0 | MB1 | MB2 | MB3 |
| EXPECTED NUMBER OF CODES | | | 3 | 2 | 4 |
| ACTUAL NUMBER OF CODES | | | 3 | 4 | 4 |
| ERROR | | | 0 | 2 | 0 |

FIG. 16

| CPB MODE | NUMBER OF DIVISIONS | GOP STRUCTURE |
|---|---|---|
| HIGH-DEFINITION | 1 | IBBP |
| INTERMEDIATE | 2 | IPPP |
| SMALL-DELAY | 4 | PPPP |

FIG. 18A

| CPB MODE | NUMBER OF DIVISIONS | GOP STRUCTURE |
|---|---|---|
| HIGH-DEFINITION | 4 | IBBP |
| INTERMEDIATE | 4 | IPPP |
| SMALL-DELAY | 4 | PPPP |

FIG. 18B

| CPB MODE | NUMBER OF DIVISIONS | GOP STRUCTURE |
|---|---|---|
| HIGH-DEFINITION | 1 | PPPP |
| INTERMEDIATE | 2 | PPPP |
| SMALL-DELAY | 4 | PPPP |

IMAGE ENCODING DEVICE ENCODING AN IMAGE BY PERFORMING SEQUENTIAL PROCESSING, METHOD FOR ENCODING IMAGE, AND COMPUTER-READABLE STORAGE MEDIUM STORING IMAGE ENCODING PROGRAM

CROSS-REFERENCE TO RELATED APPLICATION

This application is based upon and claims the benefit of priority of the prior Japanese Patent Application No. 2011-46999, filed on Mar. 3, 2011, the entire contents of which are incorporated herein by reference.

FIELD

The embodiments discussed herein are related to an image encoding device that encodes a moving image, a method for encoding an image, and a computer-readable storage medium storing an image encoding program.

BACKGROUND

In these years, since moving image data has a large amount of data, the moving image data is subjected to high-efficiency encoding when transmitted from a transmission apparatus to a reception apparatus or when stored in a storage apparatus. The "high-efficiency encoding" is an encoding process in which a certain data string is converted into another data string, thereby reducing the amount of data.

Typical methods for encoding a moving image include International Organization for Standardization/International Electrotechnical Commission (ISO/IEC) Moving Picture Experts Group (MPEG)-2/MPEG-4 (hereinafter referred to as MPEG-2 and MPEG-4).

In MPEG-2, three types of pictures, namely I, P, and B, are defined. An I-picture is a picture obtained by performing an encoding process closed within a frame without referring to an encoded image of another picture. A P-picture is a picture obtained by encoding a prediction error by performing forward prediction from a past picture. A B-picture is a picture obtained by encoding a prediction error by performing bidirectional prediction from past and future pictures.

FIG. 1 is a diagram illustrating an example of a sequence having an IBBP structure. Numbers following Is, Ps, and Bs illustrated in FIG. 1 indicate the display order. In the example illustrated in FIG. 1, the display order is B0, B1, I2, B3, B4, P5, and so on.

In FIG. 1, the encoding order is I2, B0, B1, P5, B2, B3, and so on. As illustrated in FIG. 1, a delay is caused by B-pictures. Encoded data is accumulated in a buffer and output to a decoding device. Since intra-frame encoding is performed for I-pictures, the entirety of the pictures is refreshed. Therefore, propagation of errors may be suppressed by the I-pictures.

On the other hand, in a general moving image encoder, for example, a pre-processing unit, a predictive coding unit, a variable-length coding unit, and a multiplexing unit perform sequential processing (pipeline processing) for each picture. The pre-processing unit includes a picture rearranging unit that rearranges pictures in accordance with the picture types, and sequentially outputs frame images for each picture type and frame or the like.

In the predictive coding unit, a difference from a predicted image is obtained and orthogonal transformation and quantization are performed. In the variable-length coding unit, entropy coding is performed. In the multiplexing unit, data subjected to the entropy coding is multiplexed and a bit stream to be output is generated.

FIG. 2 is a diagram illustrating an example of the sequential processing for each picture. In the example illustrated in FIG. 2, each process is sequentially performed for each picture. A multiplexed bit stream is temporarily stored in a Coded Picture Buffer (CPB) and output to a decoder.

The CPB is a buffer that holds a bit stream before the bit stream is input to the decoder. The encoder controls the CPB such that a buffer on the decoder side does not fail. In a real-time processing system, delay caused by the CPB is the largest delay.

If the size of the CPB is increased, the quality of images improves, but the delay becomes larger. If the size of the CPB is decreased, the quality of images deteriorates, but the delay may be reduced. There is a trade-off between the size of the CPB and the quality of images. How the buffer delay may be reduced while maintaining the quality of images is being studied.

"CPB" is the name of a buffer according to H.264/Advanced Video Coding (AVC) (hereinafter also referred to as H.264). In MPEG, a CPB corresponds to a Video Buffer Verifier (VBV). In the following description, a CPB is used, but in the case of MPEG, the CPB may be replaced with a VBV.

A method has been disclosed in which, in order to reduce the delay in the real-time processing, a picture is divided into several slices and the slices are subjected to sequential processing. For example, in Japanese Laid-open Patent Publication Nos. 2000-224584, 2010-34802, and 2010-62946, methods have been disclosed in which the size of a slice (the number of macroblocks in a slice) is determined on the basis of the magnitude of a motion vector, the circuit capacity, and the number of codes written to the buffer.

SUMMARY

In accordance with an aspect of the embodiments, an image encoding device that encodes an image by performing sequential processing in units of a certain size, the image encoding device includes, a variable-length coding unit that performs variable-length coding on data to be encoded having the certain size in the image; an estimating unit that estimates the number of codes at a time after the variable-length coding using the data to be encoded at a time before the variable-length coding is performed by the variable-length coding unit; and a slice controlling unit that controls division of the image into slices on the basis of a cumulative value of the estimated number of codes.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 7 is a diagram illustrating a problem (first problem) caused by the division into slices in the related art;

FIG. 8 is a diagram illustrating a problem (second problem) caused by the division into slices in the related art;

FIG. 14 is a diagram illustrating an example in which a cumulative value of the expected number of codes is corrected;

FIG. 16 is a diagram illustrating an example of CPB modes;

FIGS. 18A and 18B are diagrams illustrating other examples of the CPB modes.

DESCRIPTION OF EMBODIMENTS

Figure 1:
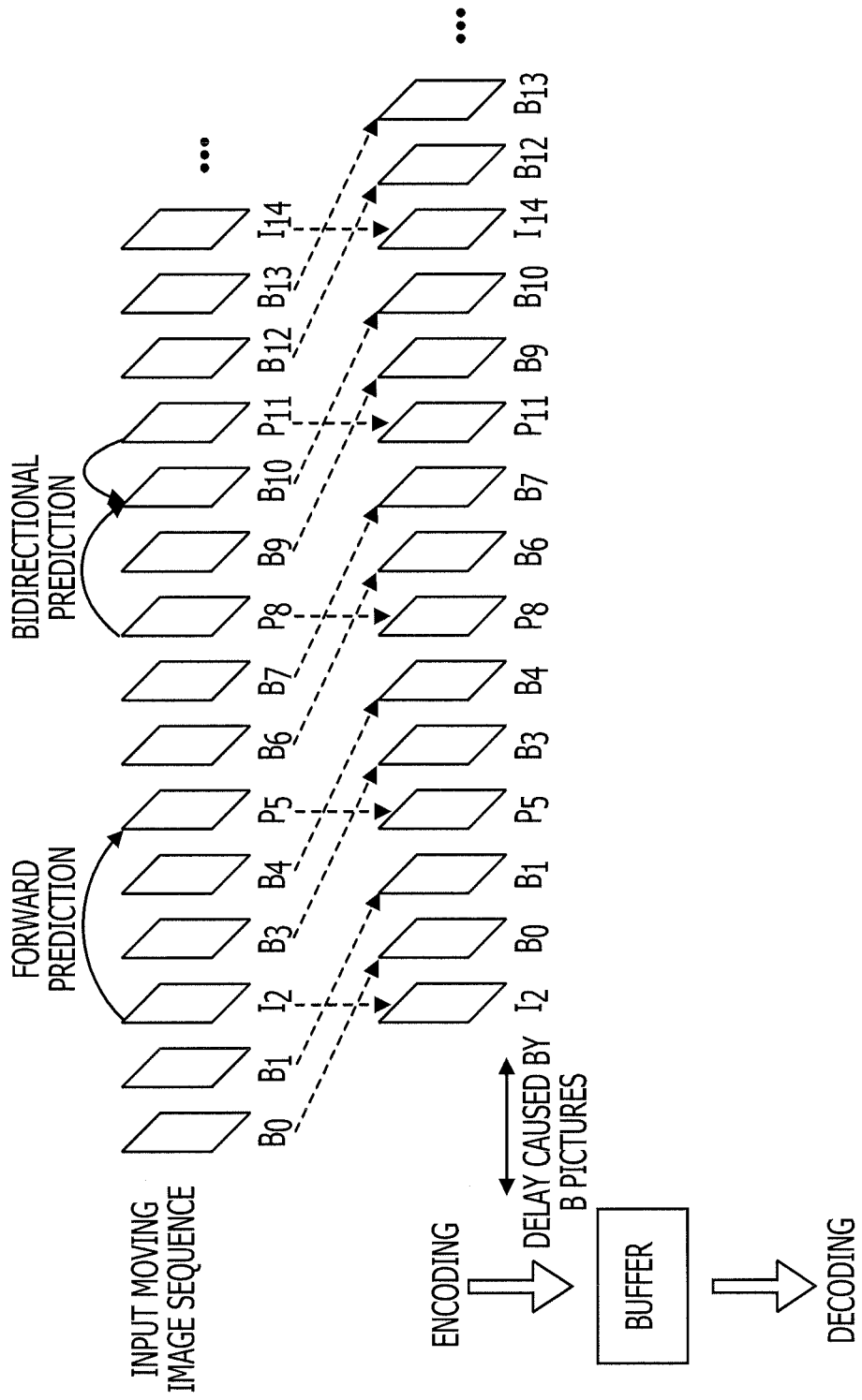
FIG. 1 is a diagram illustrating an example of a sequence having an IBBP structure.
Figure 2:
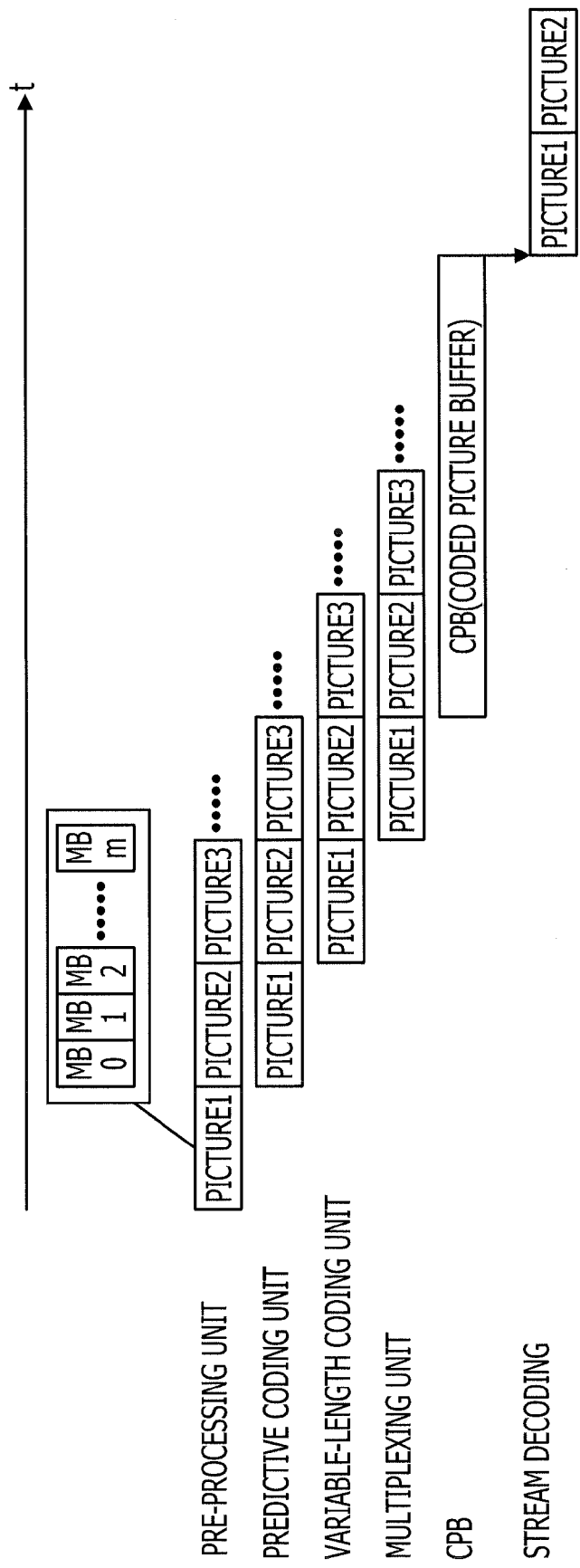
FIG. 2 is a diagram illustrating an example of sequential processing for each picture.
Figure 3:
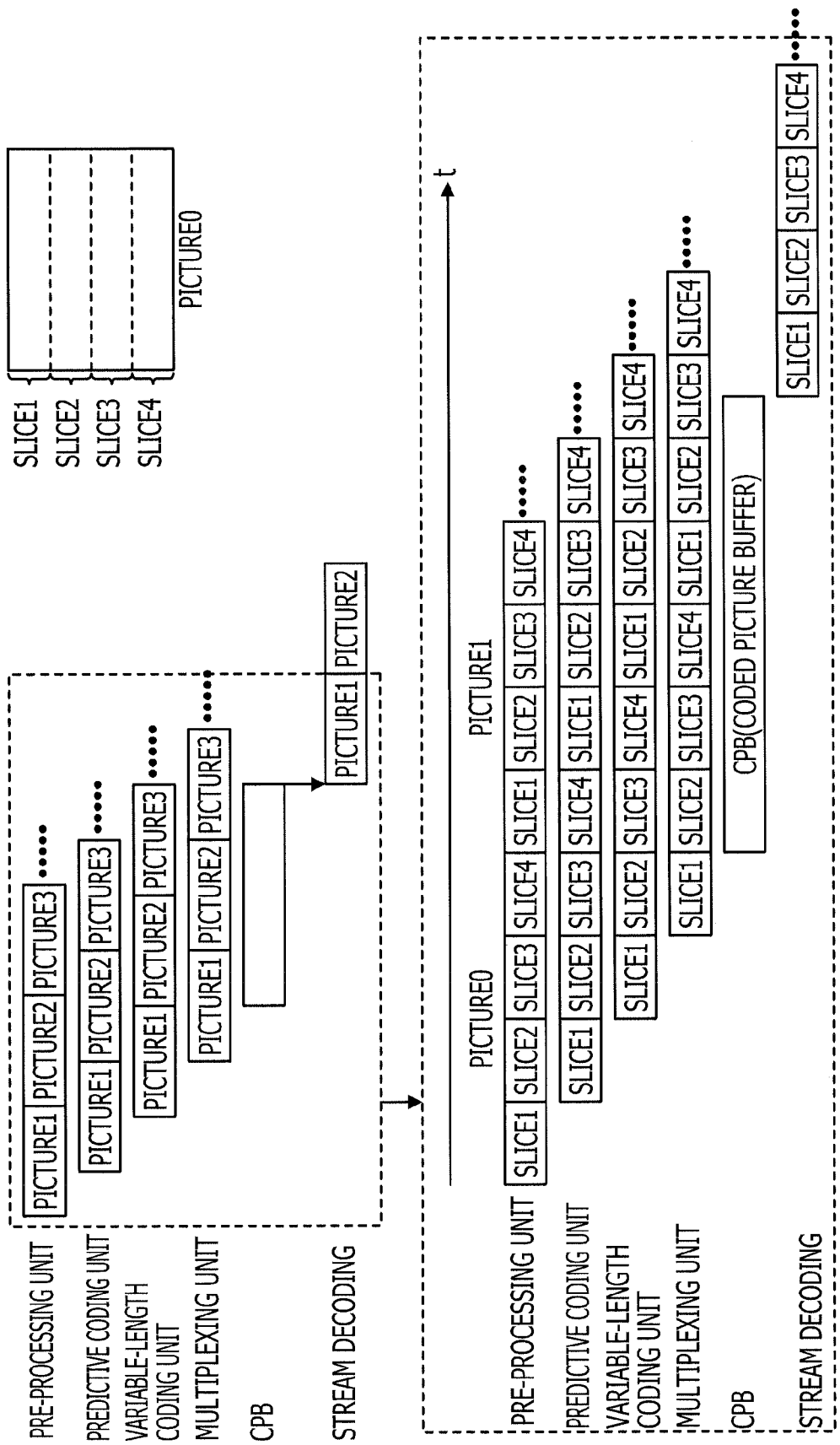
FIG. 3 is a diagram illustrating an example of sequential processing at a time when a picture is divided into four slices.

As a result of a study conducted by the inventor, the following knowledge has been newly obtained. Suppose that an image is divided into certain sizes in order to reduce encoder delay. FIG. 3 is a diagram illustrating an example of sequential processing at a time when a picture is divided into four slices. As illustrated in FIG. 3, by performing the sequential processing for each slice, the delay may be smaller than that occurring in the sequential processing for each picture.

Figure 4:
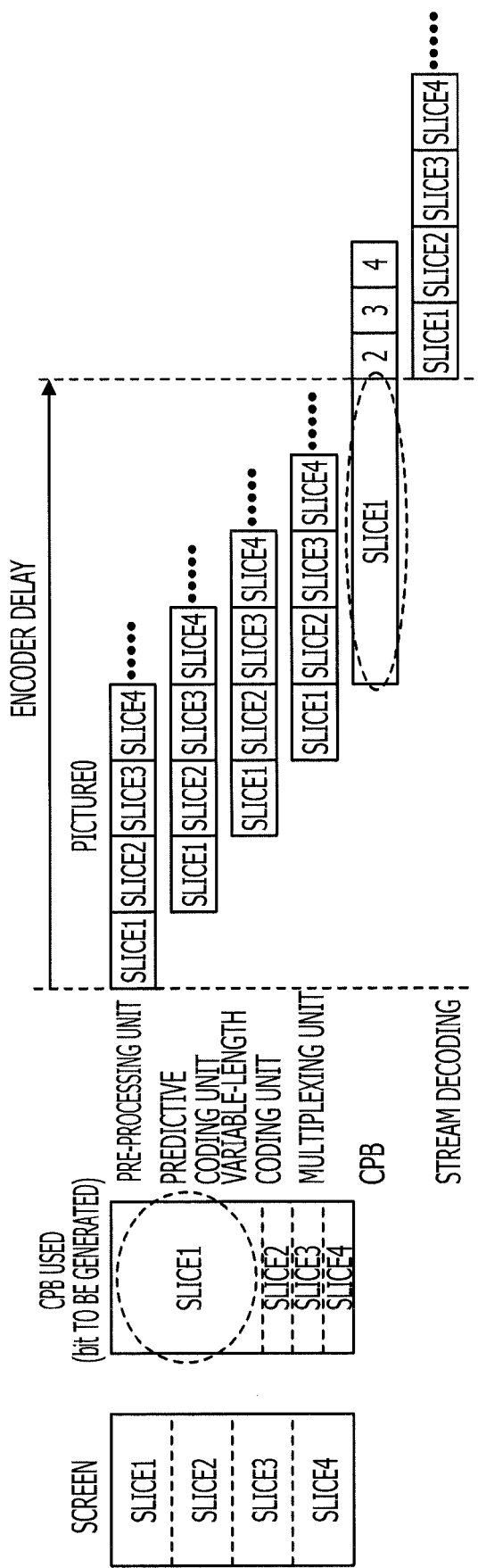
FIG. 4 is a diagram illustrating a relationship between the number of bits and encoder delay in a slice.

However, the number of bits generated in each slice is not constant. FIG. 4 is a diagram illustrating a relationship between the number of bits and the encoder delay in a slice. As illustrated in FIG. 4, almost all the number of bits for one picture may be generated in a certain slice. In the example illustrated in FIG. 4, the number of bits almost equivalent to one picture is generated in slice1.

Therefore, in this case, it is difficult to significantly reduce the encoder delay caused by division into slices. This is because the CPB has substantially the same size as a CPB at the time of the sequential processing for each picture. If the size of the CPB is reduced, the capacity of the CPB becomes insufficient, thereby losing a part of data. If a part of the data is lost, an error stream is caused, thereby making it difficult to normally decode the data.

Figure 5:
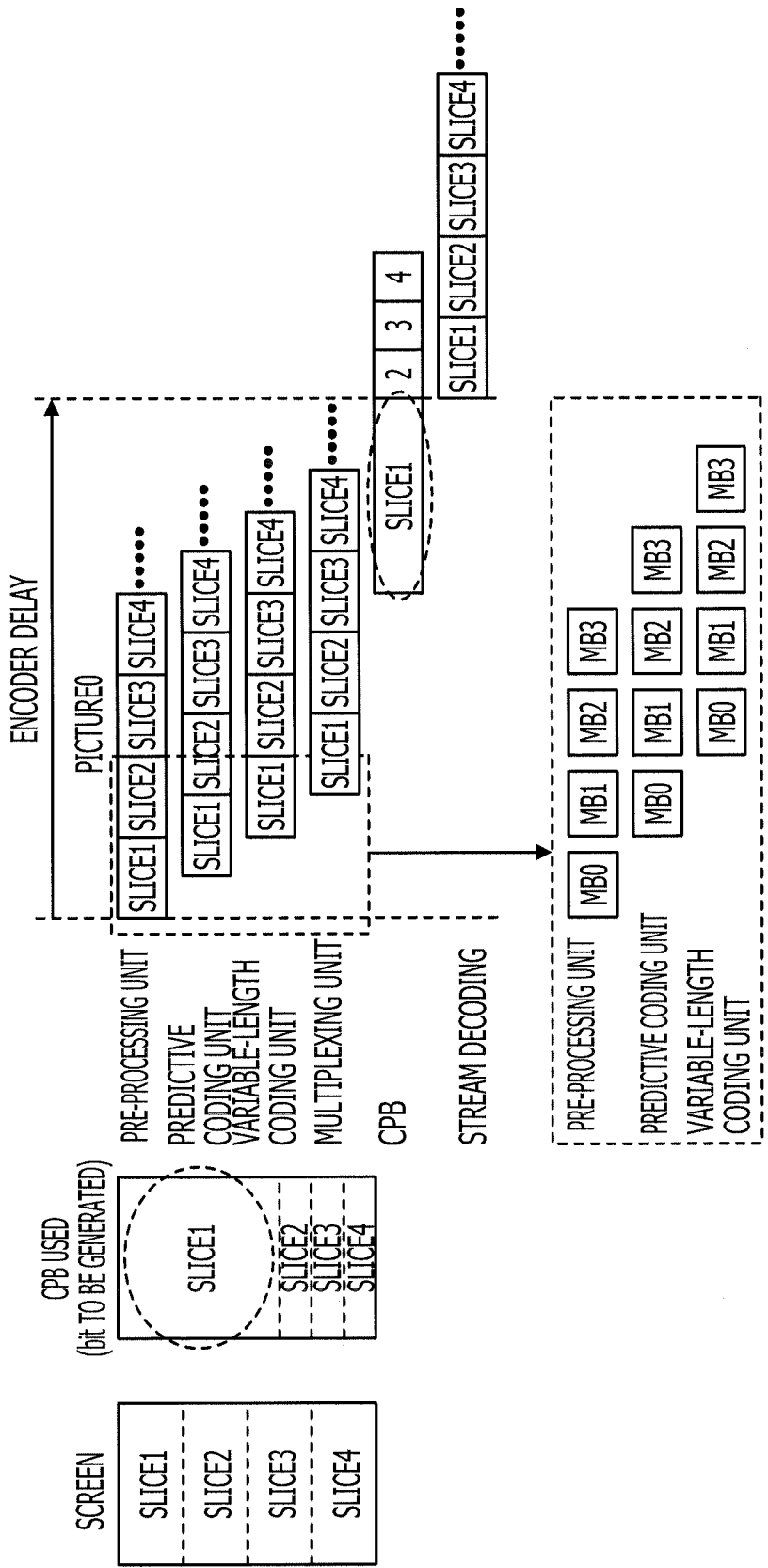
FIG. 5 is a diagram illustrating a relationship between sequential processing for each macroblock and the encoder delay.

Next, suppose that the sequential processing is performed for each macroblock. FIG. 5 is a diagram illustrating a relationship between the sequential processing for each macroblock and the encoder delay. As illustrated in FIG. 5, in the sequential processing for each macroblock, although it is possible to further reduce the delay than in the case of the sequential processing for each slice, it is difficult to reduce the size of the CPB.

The reason why it is difficult to reduce the size of the CPB is that, as described above, almost all the number of bits for one picture may be generated in one slice, and therefore the size of the CPB becomes the same as that of a CPB when the sequential processing is performed for each picture. When the size of the CPB is the same as in the case of the sequential processing for each picture, the delay caused by the CPB is also the same.

When it is difficult to reduce the size of the CPB because a large part of the total number of bits is generated in a certain slice, a method may be used in which the division into slices is performed on the basis of the number of bits generated as disclosed in the related art. In this method, the size of the CPB may be reduced by equalizing the size of the CPB.

Figure 6B:
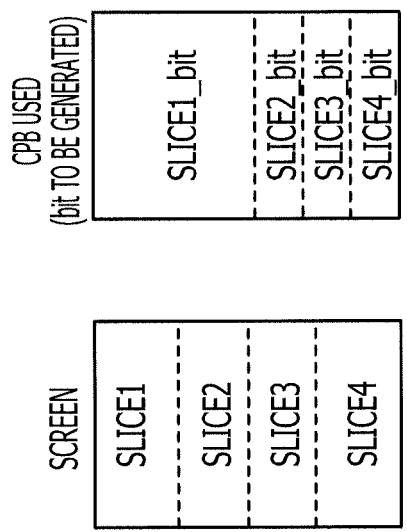
FIGS. 6A and 6B are diagrams illustrating relationships between the number of bits generated and division into slices.
Figure 6A:
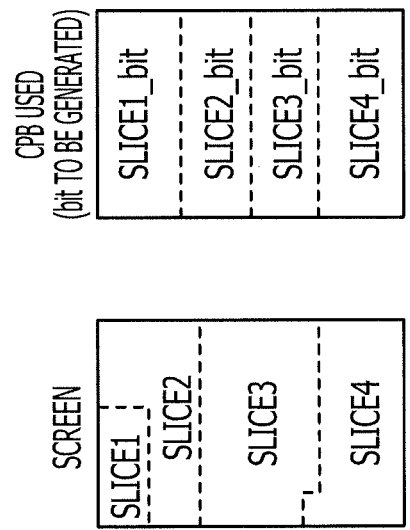

FIGS. 6A and 6B are diagrams illustrating relationships between the number of bits generated and the division into slices. As illustrated in FIG. 6A, when the division is performed such that the resultant slices have the same size, the number of bits (the number of codes) generated in each slice is different. As illustrated in FIG. 6B, when the number of bits generated is equalized, the size of each slice varies. As illustrated in FIG. 6B, since the numbers of codes generated in slice1 to slice4 are the same, it is possible to reduce the size of the CPB.

However, when division control is performed such that the number of bits generated in each slice becomes the same on the basis of the number of bits written to a buffer unit as in the related art, abnormal data that will be described hereinafter is undesirably generated.

FIG. 7 is a diagram illustrating a problem (first problem) caused by division into slices in the related art. As illustrated in FIG. 7, for example, the sequential processing is performed for each macroblock (MB) and the number of codes generated is counted. When the cumulative value of the number of codes has exceeded a threshold value, the division into slices is performed such that a next MB belongs to a new slice.

As illustrated in FIG. 7, however, when the division is performed such that MB2 and MB3 belong to different slices, because the predictive coding has already been completed in MB3, the image region of MB2 might be being referred to, which makes it difficult to maintain the independence of the slices. In addition, when it is difficult to maintain the independence of the slices, it is also difficult to suppress propagation of errors, thereby causing a problem in that it is difficult to refresh each slice.

In the case of encoding according to H.264, it is difficult to judge that there is a slice boundary between MB2 and MB3 in the process of the predictive coding. Therefore, there may be a case in which deblocking filtering overlaps the slice boundary, thereby undesirably losing the independence of the slices.

In the case of encoding according to H.263, because the slices are not independent from each other, the slice structured mode of Annex K is not available. The image region of another slice is referred to in order to predict a motion vector, which is a violation of the standard.

In order to solve the above problem, the predictive coding is performed again and data in the predictive coding unit is corrected. However, cost undesirably increases when the predictive coding is performed again.

FIG. 8 is a diagram illustrating a problem (second problem) caused by the division into slices in the related art. In the example illustrated in FIG. 8, the threshold value is assumed to be exceeded when the number of codes generated in MB2 has been added. In this case, the division is performed such that MB1 and MB2 belong to different slices. In order to maintain the independence of the slices, MB2, which has been subjected to the variable-length coding, is discarded and the process is begun again from MB2.

In order to perform the process again from MB2, a mechanism that holds previous MB information is provided and data that has already been written to the CPB is discarded. In addition, in the pre-processing unit or the predictive coding unit, a function of correcting a head MB is provided.

Therefore, even in a case in which an image is divided into slices having the same size, it has been difficult to reduce the size of the buffer while suppressing deterioration of the quality of the image. In addition, even in a case in which an image is divided into slices such that the number of codes generated is the same in each slice, it has been difficult to maintain the independence of the slices and the process such as the predictive coding is performed again, which has made it difficult to perform efficient encoding.

The embodiments will be described hereinafter with reference to the accompanying drawings.

Figure 9:
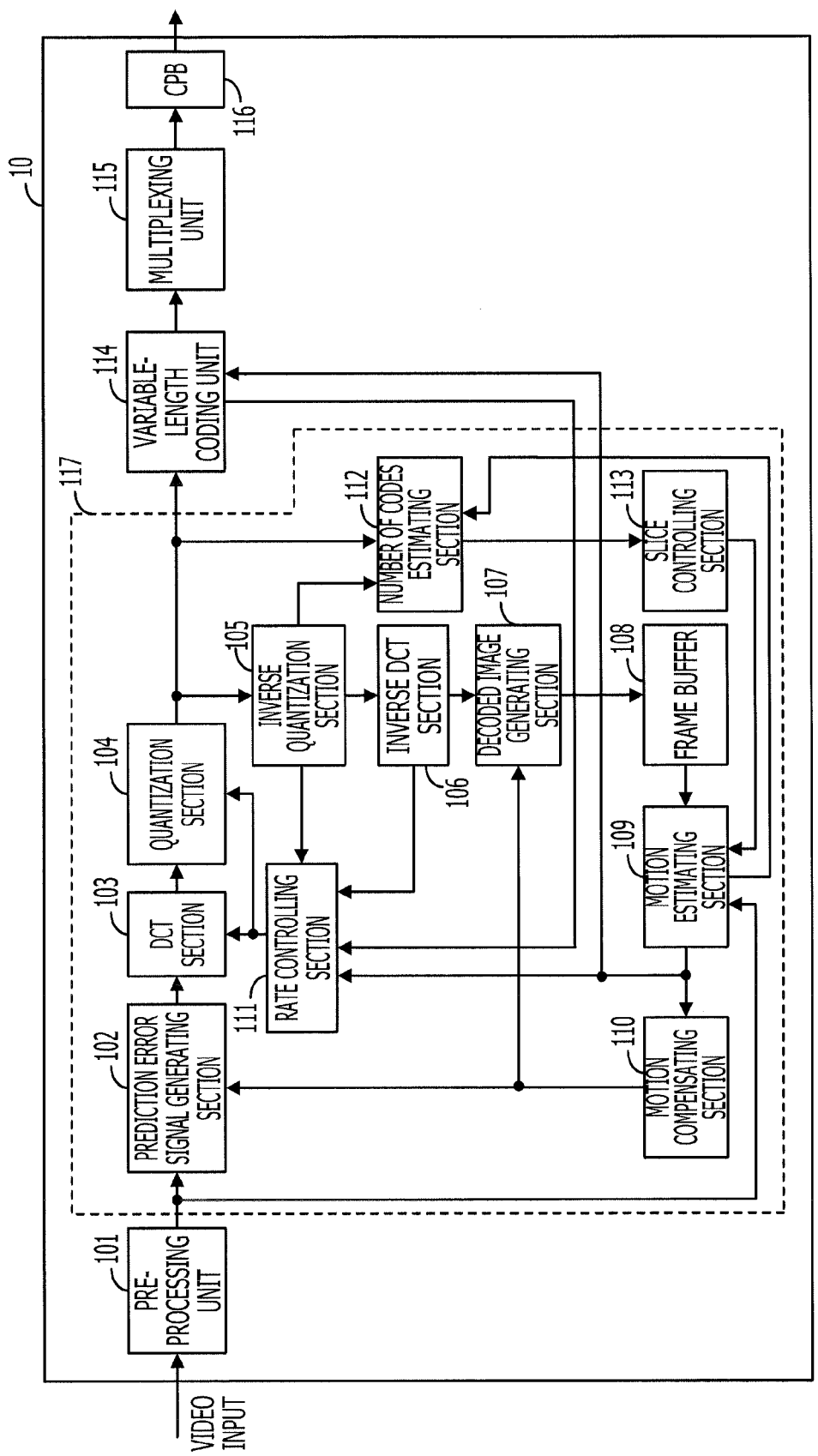
FIG. 9 is a block diagram illustrating an example of the configuration of an image encoding device according to a first embodiment.

FIG. 9 is a block diagram illustrating an example of the configuration of an image encoding device 10 according to a first embodiment. The image encoding device 10 illustrated in FIG. 9 has a pre-processing unit 101, a predictive coding unit 117, a variable-length coding unit 114, a multiplexing unit 115, and a CPB 116.

The predictive coding unit 117 has a prediction error signal generating section 102, a Discrete Cosine Transform (DCT) section 103, a quantization section 104, an inverse quantization section 105, an inverse DCT section 106, a decoded image generating section 107, a frame buffer 108, a motion estimating section 109, a motion compensating section 110, a rate controlling section 111, a number of codes estimating section 112, and a slice controlling section 113.

In the first embodiment, an example will be described in which the pre-processing unit 101, the predictive coding unit 117, the variable-length coding unit 114, the multiplexing unit 115, and the CPB 116 are subjected to the sequential processing for each MB.

The pre-processing unit 101 includes a picture rearranging section that rearranges pictures in accordance with the picture types, and sequentially outputs frame images for each picture type and frame or the like. In addition, the pre-processing unit 101 may generate a reduced image and perform a process for investigating the direction of motion or the like.

The prediction error signal generating section 102 obtains macroblock data (hereinafter also referred to as "MB data"), in which an image to be encoded included in input moving image data has been divided into 16×16 pixel blocks (MBs). The prediction error signal generating section 102 generates a prediction error signal on the basis of the MB data and MB data regarding a predicted image output from the motion compensating section 110. The prediction error signal generating section 102 outputs the generated prediction error signal to the DCT section 103.

The DCT section 103 performs a DCT on the input prediction error signal in units of 8×8 or 4×4. Alternatively, instead of the DCT, an orthogonal transform such as a Hadamard transform may be performed. The DCT section 103 obtains data that has been divided into horizontal and vertical frequency components through the process of the orthogonal transform.

The reason why the data is transformed into the frequency components is that most pieces of the data may be included in low-frequency components due to a spatial correlation of the image, thereby making it possible to reduce the amount of information.

The quantization section 104 reduces the number of codes in the data (DCT coefficients) that has been subjected to the orthogonal transform by quantizing the data, and outputs the quantized data to the variable-length coding unit 114 and the inverse quantization section 105. In addition, the quantization section 104 may output the quantized value to the number of codes estimating section 112 depending on the situation.

The inverse quantization section 105 performs inverse quantization on the data output from the quantization section 104. The inverse quantization section 105 outputs the data that has been subjected to the inverse quantization to the inverse DCT section 106, the number of codes estimating section 112, and the rate controlling section 111.

The inverse DCT section 106 performs an inverse DCT on the data that has been subjected to the inverse quantization in order to transform the frequency components into pixel components, and outputs the data at a time after the transform to the decoded image generating section 107 and the rate controlling section 111. By performing this process with the inverse DCT section 106, it is possible to obtain a signal that is substantially the same as the prediction error signal before the encoding.

The decoded image generating section 107 adds MB data regarding an image that has been subjected to motion compensation in the motion compensating section 110 and the prediction error signal that has been subjected to the decoding process in the inverse DCT section 106. Thus, a processed image that is the same as one on the decoding side may be generated on the encoding side.

The image generated on the encoding side is called a "locally decoded image". By generating a processed image on the encoding side that is the same as one on the decoding side, it is possible to perform differential encoding on subsequent pictures. The decoded image generating section 107 outputs, to the frame buffer 108, MB data regarding the locally decoded image that has been generated by adding the MB data and the prediction error signal. The MB data regarding the locally decoded image may be subjected to deblocking filtering. The locally decoded image may be a reference image.

The frame buffer 108 stores the input MB data as data regarding a new reference image and outputs the data to the motion estimating section 109.

The motion estimating section 109 performs motion detection using the MB data regarding the image to be encoded and the MB data regarding the encoded reference image that has been obtained from the frame buffer 108, in order to obtain an appropriate motion vector.

A motion vector is a value that indicates a spatial deviation for each block obtained by using a block matching technique by which a position of the reference image that is most similar to the image to be encoded is detected for each block.

In the motion detection, in general, for example, not only how large the sum of absolute differences of pixels is but also an evaluation value of a motion vector is added. When a motion vector is encoded, not the component itself but a difference vector relative to a motion vector of a nearby MB is encoded. Therefore, the motion estimating section 109 obtains a difference vector and outputs an evaluation value corresponding to the code length of the motion vector in accordance with the size of the component.

The motion estimating section 109 outputs the detected motion vector to the motion compensating section 110 and the number of codes estimating section 112.

The motion compensating section 110 performs motion compensation on the data regarding the reference image using the motion vector provided from the motion estimating section 109. Thus, MB data as the reference image that has been subjected to the motion compensation is generated.

The rate controlling section 111 controls a quantization scale value (qP value) on the basis of the obtained data, in order to control the bit rate.

The number of codes estimating section 112 estimates the number of codes in each encoding process unit (for example, an MB or the like) at a time after the variable-length coding using the data to be encoded at a time before the variable-length coding. Various methods relating to the estimation of the number of codes will be described hereinafter.

A method in which a DCT coefficient is used will be described. The number of codes estimating section 112 estimates the number of codes using the DCT coefficients output from the inverse quantization section 105. The number of codes estimating section 112 estimates the number of codes by using the rate-distortion function of AC coefficients included in the DCT coefficients and by determining, as the number of codes in an MB, the sum of the number of bits $B_{ij}$ that may be obtained as the square of each AC coefficient using the following expression (1).

$$\text{Bit} = \sum_{i=0}^{n}\sum_{j=0}^{m} B_{ij} \text{ (except for } i = 0 \text{ and } j = 0) \qquad \text{Expression (1)}$$

The rate-distortion function D may be represented by an expression (2) when the distribution of the AC coefficients is assumed to be the Gaussian distribution.

$$D = \sigma_y^2 \cdot 2^{-2b} \qquad \text{Expression (2)}$$

In the above expression (2), "σ" denotes variance and "b" denotes the number of bits.

By converting the expression (2), an expression (3) is obtained.

$$Bij = \frac{1}{2}\log_2 \frac{\sigma_y^2}{D} \qquad \text{Expression (3)}$$

The variation is originally represented by the square of σ, but the number of codes estimating section 112 estimates that the square of each AC coefficient is a value close to the square of σ, and substitutes each AC coefficient for σ and a certain value for D in order to calculates $B_{ij}$. The number of codes estimating section 112 outputs the value obtained by the expression (1) to the slice controlling section 113.

A method in which a motion vector is used will be described. The number of codes estimating section 112 estimates the number of codes in an MB using the magnitude of a motion vector obtained from the motion estimating section 109. Since the motion vector, too, is included in the data to be encoded, when the number of codes in other pieces of data is assumed to be the same, the number of codes in the MB may be estimated on the basis of the magnitude of the motion vector.

When the magnitude of the motion vector is assumed to be x, the number of codes estimating section 112 estimates the number of codes using an estimation function F(x).

$$F(x) = |x| \times \beta 1 \text{ (constant)} \qquad \text{Expression (4)}$$

$$F(x) = \log|x| \times \beta 2 \text{ (constant)} \qquad \text{Expression (5)}$$

$$F(x) = |x|^2 \times \beta 3 \text{ (constant)} \qquad \text{Expression (6)}$$

The number of codes estimating section 112 obtains F(x) using any of the expressions (4) to (6) and estimates the value of F(x) to be the number of codes. The number of codes estimating section 112 outputs the estimated number of codes to the slice controlling section 113.

A method in which a quantized value is used will be described. The number of codes estimating section 112 estimates the number of codes using the "level" and the "run" of a quantized value. The number of codes estimating section 112 estimates the number of codes on the basis of an estimation function G(y) using the "run" and the "level" of a DCT coefficient after quantization. For example, the number of codes estimating section 112 estimates "G(run)+G(level)" to be the number of codes.

$$G(y) = |y| \times \gamma 1 \text{ (constant)} \qquad \text{Expression (7)}$$

$$G(y) = \log|y| \times \gamma 2 \text{ (constant)} \qquad \text{Expression (8)}$$

$$G(y) = y^2 \times \gamma 3 \text{ (constant)} \qquad \text{Expression (9)}$$

Here, the "run" or the "level" is substituted for y.

The above-described estimation methods are just examples, and the number of codes estimating section 112 may estimate the number of codes using data at a time before the variable-length coding. In addition, the number of codes estimating section 112 may estimate the number of codes in an MB by combining the above-described numbers of codes.

The number of codes estimating section 112 may obtain the number of codes by, for example, adding Bit obtained using the expression (1) and F(x) obtained using any of the expressions (4) to (6). Alternatively, the number of codes estimating section 112 may obtain the number of codes by, for example, adding F(x) obtained using any of the expressions (4) to (6) and G(y) obtained using any of the expression (7) to (9). Alternatively, the number of codes estimating section 112 may obtain the number of codes by, for example, adding Bit obtained using the expression (1) and G(y) obtained using any of the expressions (7) to (9). The estimated number of codes is called the "expected number of codes".

The slice controlling section 113 accumulates the number of codes obtained from the number of codes estimating section 112 and judges whether or not a cumulative value exceeds a threshold value. When the cumulative value has exceeded the threshold value, the division into slices is performed such that there is a slice boundary between an MB with which the threshold value has been exceeded and a next MB.

After performing the division into slices, the slice controlling section 113 outputs the details of the division to the motion estimating section 109, in order to cause the motion estimating section 109 not to refer to different slices and therefore maintain the independence of the slices.

Figure 10:
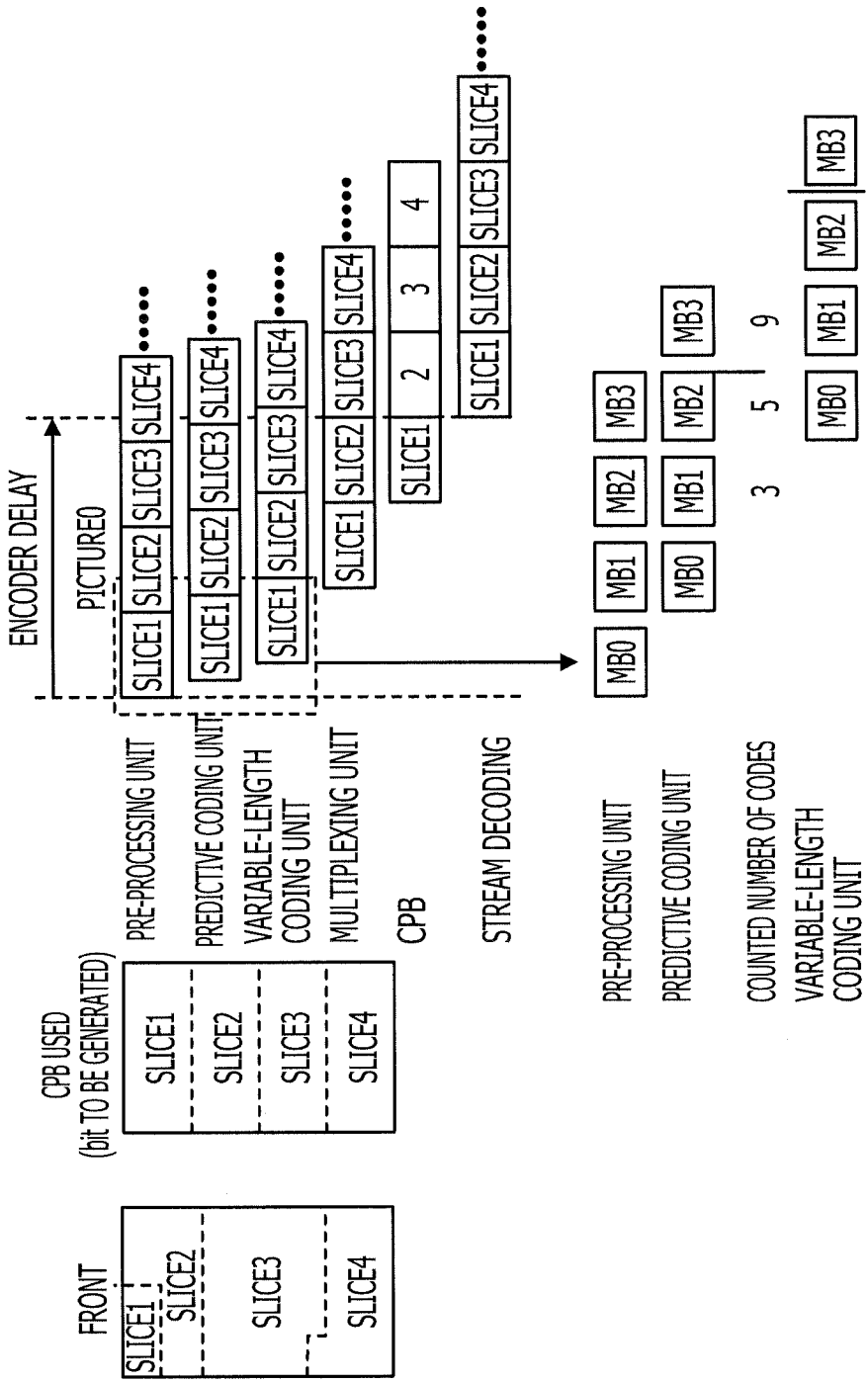
FIG. 10 is a diagram illustrating division into slices according to the first embodiment.

FIG. 10 is a diagram illustrating the division into slices according to the first embodiment. As illustrated in FIG. 10, the division into slices is performed such that the expected number of codes becomes even in an image. If the expectation is correct, it is possible to perform the division into slices such that the number of codes generated becomes even.

As illustrated in FIG. 10, for example, the expected number of codes in MB0 is assumed to be 3, the expected number of codes in MB1 is assumed to be 2, and the expected number of codes in MB2 is assumed to be 4. The threshold value is assumed to be 8. At this time, the cumulative value of the expected number of codes at the point of MB2 is 9 (=3+2+4), exceeding the threshold value. Therefore, the slice controlling section 113 controls the division into slices such that division is performed before MB3.

Thus, by making a judgment as to the division into slices with the predictive coding unit 117, it is possible to maintain the independence of the slices. Since the slices are independent, it is possible to refresh the slices in order to suppress propagation of errors.

In addition, even when the encoding method is H.264, it is possible to avoid deblocking filtering between MB2 and MB3, which are separated from each other by a slice boundary. In addition, even when the encoding method is H.263, it is possible to avoid a violation of the standard.

In FIG. 9, the variable-length coding unit 114 performs variable-length coding on the data output from the quantization section 104 and outputs the data. The variable-length coding is a method in which a variable-length code is assigned in accordance with the frequency of appearance of a symbol.

The variable-length coding unit 114 basically assigns, for example, a shorter code to a combination between coefficients whose frequency of appearance is higher and a longer code to a combination between coefficients whose frequency of appearance is lower. Thus, the overall code length is reduced. For example, in H.264, a variable-length code according to a method called "Context-Adaptive Variable-Length Coding (CAVLC)" or "Context-Adaptive Binary Arithmetic Coding (CABAC)" may be selected.

The multiplexing unit 115 multiplexes the data that has been subjected to the variable-length coding in order to obtain a bit stream to be output.

The CPB 116 stores the bit stream. The bit stream stored in the CPB 116 is output to the decoding device.

Figure 11:
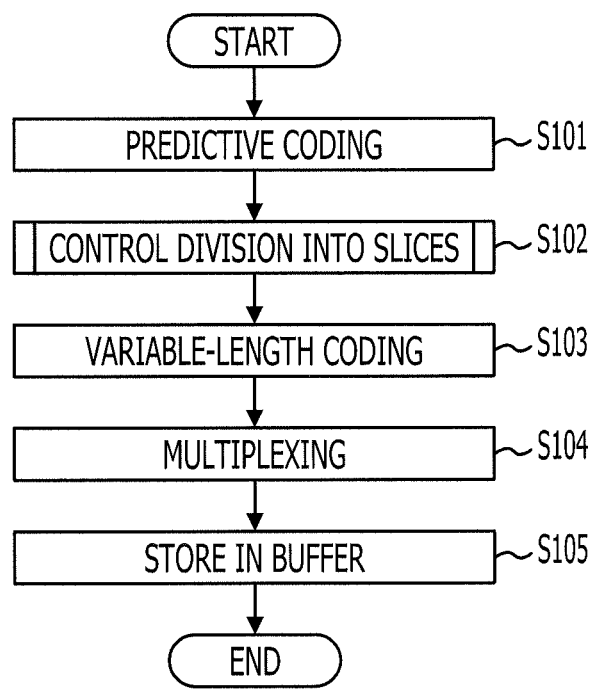
FIG. 11 is a flowchart illustrating an example of an encoding process according to the first embodiment.

Next, the operation of the image encoding device 10 according to the first embodiment will be described. FIG. 11 is a flowchart illustrating an example of an encoding process according to the first embodiment. The process illustrated in FIG. 11 is a process performed for each MB after the pre-processing. In step S101, the predictive coding unit 117 performs predictive coding on an image for each MB.

In step S102, the number of codes estimating section 112 and the slice controlling section 113 estimate the number of codes using data to be encoded at a time before variable-length coding, and control the division into slices on the basis of the estimated number of codes, respectively. This process will be described later with reference to FIG. 12.

In step S103, the variable-length coding unit 114 performs the variable-length coding on the data to be encoded. The steps S102 and S103 may be performed in parallel with each other.

In step S104, the quantization section 104 performs multiplexing on the image including the data that has been subjected to the variable-length coding, in order to generate a bit stream to be output from the image encoding device 10.

In step S105, the CPB 116 stores the bit stream in order for a movie not to fail on the decoding side.

Figure 12:
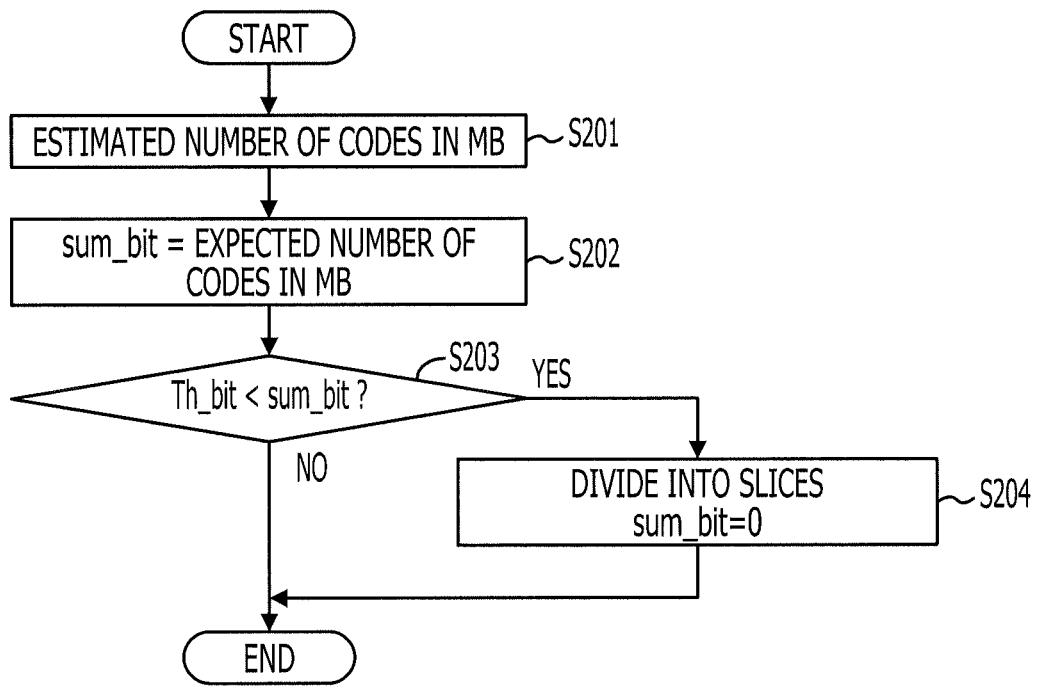
FIG. 12 is a flowchart illustrating an example of a process for controlling the division into slices according to the first embodiment.

FIG. 12 is a flowchart illustrating an example of a process for controlling the division into slices according to the first embodiment. In step S201 illustrated in FIG. 12, the number of codes estimating section 112 estimates the number of codes (expected number of codes) in each MB at a time after the variable-length coding using the data to be encoded at a time before the variable-length coding. The expected number of codes in each MB that has been estimated is output to the slice controlling section 113.

In step S202, the slice controlling section 113 accumulates, using the following expression (10), the expected number of codes that has been obtained:

$$\text{sum\_bit} = \text{Expected number of codes in MB} \quad \text{Expression (10)}$$

"sum_bit" is a cumulative value of the expected number of codes and reset to 0 when processing of a picture begins.

In step S203, the slice controlling section 113 judges whether or not the cumulative value sum_bit has exceeded a threshold value Th_bit. If the cumulative value has exceeded the threshold value (YES in step S203), the process proceeds to step S204. If the cumulative value is equal to or smaller than the threshold value (NO in step S203), processing of a next MB begins.

The threshold value Th_bit may be obtained using, for example, the following expression (11):

$$\text{Th\_bit} = \text{Bit rate}/(\text{Picture rate} \times \text{Number of divisions}) \quad \text{Expression (11)}$$

The picture rate is the number of pictures per second, which is 60 in the field structure and 30 in the frame structure. When the bit rate is assumed to be 6 Mbps and the number of divisions is assumed to be 4, the threshold value is 25,000 bits from the expression Th_bit=6,000,000/(60×4)=25,000 (bit).

In step S204, the slice controlling section 113 controls the division into slices such that an MB following the MB with which the threshold value has been exceeded belongs to a next slice. At this time, sum_bit is reset to 0.

As described above, according to the first embodiment, it is possible to reduce the buffer size while maintaining the independence of the slices, thereby reducing a delay. In addition, according to the first embodiment, since the buffer size suits the number of codes in each slice, even if the buffer size is reduced, data is not broken and therefore deterioration of the quality of images may be avoided.

It is to be noted that even if the number of divisions of each picture is set to 4, each picture is not necessarily divided into four slices, because the number of bits is different between the pictures. No problem is caused even if the number of slices obtained by dividing each picture is different between the pictures.

Next, an image encoding device 20 according to a second embodiment will be described. In the second embodiment, the image encoding device 20 has a mechanism that feeds back an error between the expected number of codes and the number of codes generated. Therefore, it is possible to perform the division into slices such that the number of codes generated becomes more even.

Figure 13:
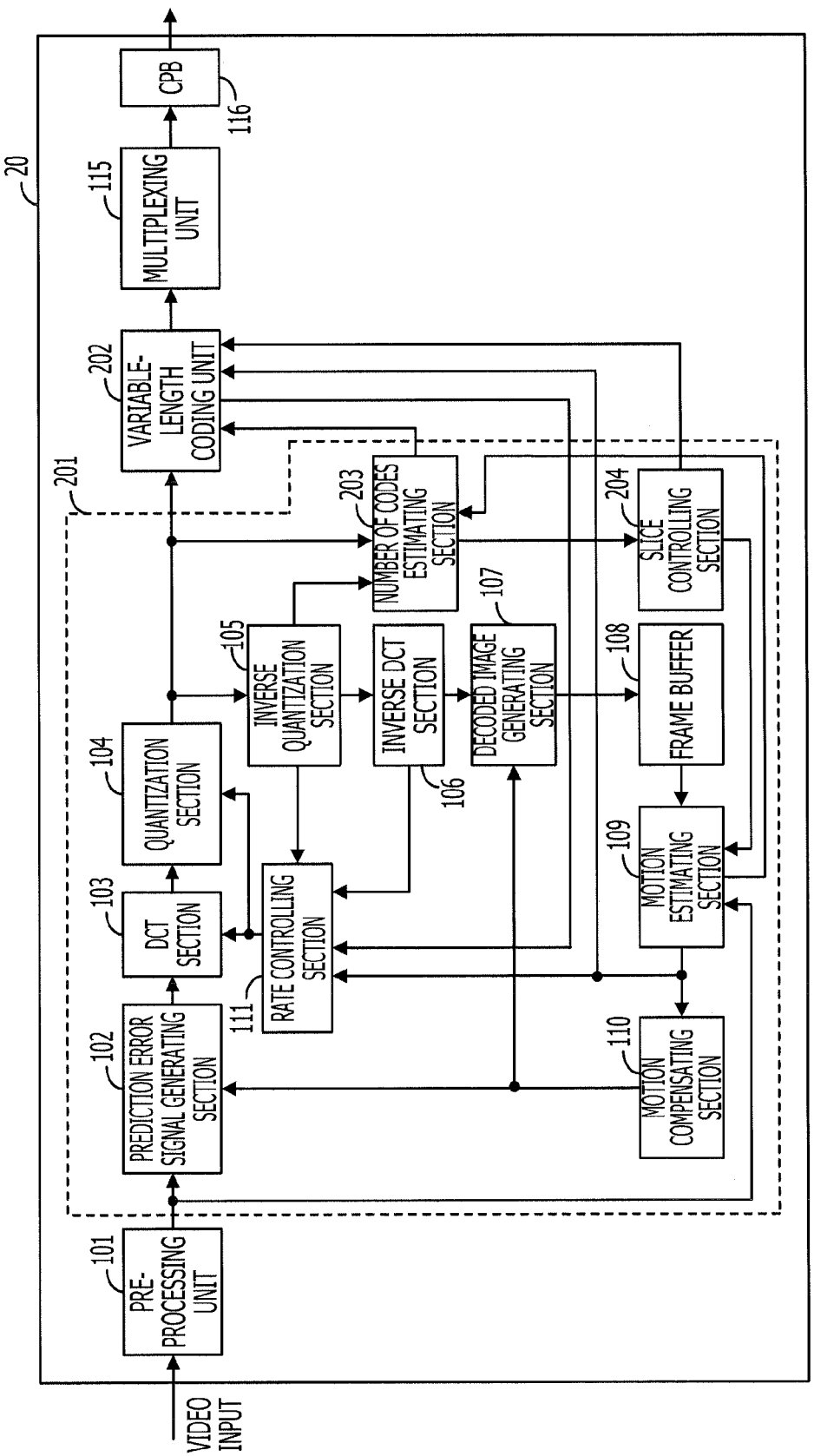
FIG. 13 is a block diagram illustrating an example of the configuration of an image encoding device according to a second embodiment.

FIG. 13 is a block diagram illustrating an example of the configuration of the image encoding device 20 according to the second embodiment. In the configuration illustrated in FIG. 13, the same reference numerals as in FIG. 9 are given to the same components as those illustrated in FIG. 9, and therefore description of such components is omitted.

A predictive coding unit 201 obtains an error in the number of codes from a variable-length coding unit 202. Therefore, a number of codes estimating section 203 outputs the expected number of codes that has been estimated to the variable-length coding unit 202. The variable-length coding unit 202 obtains an error between the expected number of codes that has been obtained and the number of codes at a time after the variable-length coding, and outputs the error to a slice controlling section 204.

The slice controlling section 204 corrects a cumulative value of the expected number of codes using the error obtained from the variable-length coding unit 202. The slice controlling section 204 controls the division into slices using the corrected cumulative value.

The variable-length coding unit 202 may output the number of codes at a time after the variable-length coding to the slice controlling section 204 and let the slice controlling section 204 obtain the error. In this case, the number of codes estimating section 203 does not output the expected number of codes to the variable-length coding unit 202.

FIG. 14 is a diagram illustrating an example in which the cumulative value of the expected number of codes is corrected. In the example illustrated in FIG. 14, the expected number of codes in MB0 is assumed to be 3, the expected number of codes in MB1 is assumed to be 2, and the expected number of codes in MB2 is assumed to be 4. In addition, the actual number of codes in MB0 is assumed to be 3, the actual number of codes in MB1 is assumed to be 4, and the actual number of codes in MB2 is assumed to be 4. Therefore, there is an error of "+2" in MB2.

After obtaining the error of 2 in MB2 from the variable-length coding unit 202, the slice controlling section 204 corrects the cumulative value when adding the expected number of codes in MB3. The slice controlling section 204 corrects the cumulative value by, for example, adding the error of 2 to the cumulative value of the expected number of codes of 9 at the point of MB2.

Thus, by correcting the cumulative value of the expected number of codes using the error between the actual number of codes and the expected number of codes, it is possible to perform the division into slices such that the actual number of codes becomes more even.

Figure 15:
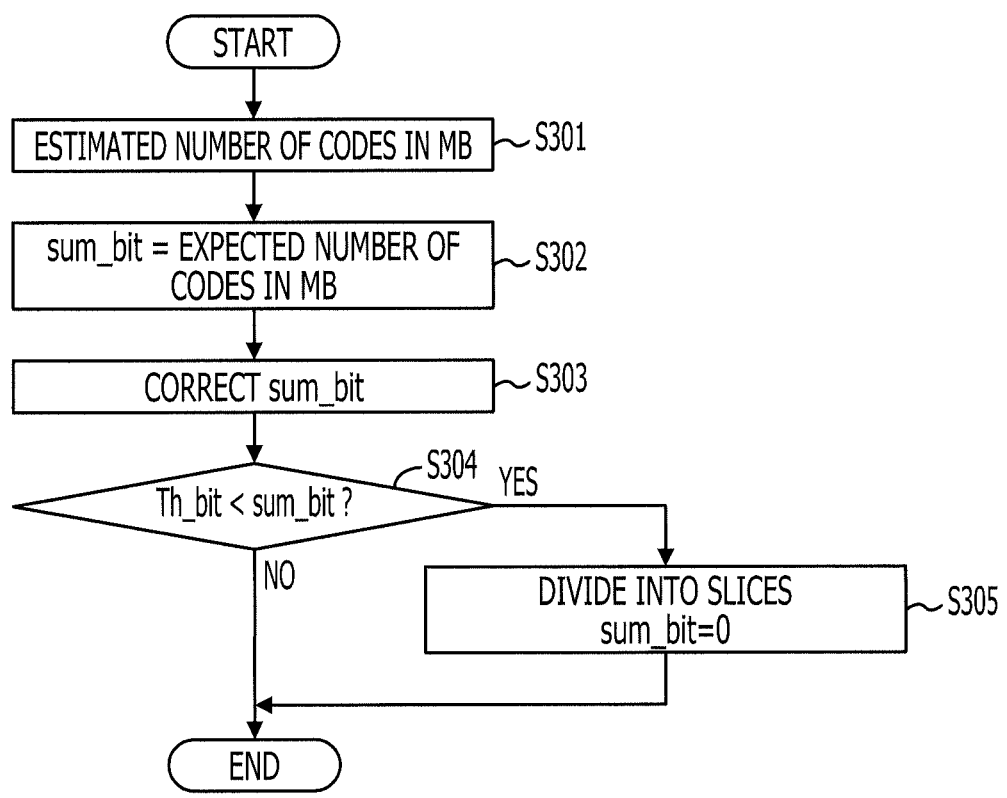
FIG. 15 is a flowchart illustrating an example of a process for controlling the division into slices according to the second embodiment.

Next, the operation of the image encoding device 20 according to the second embodiment will be described. A process for encoding an MB is the same as that illustrated in FIG. 11, and therefore description thereof is omitted. FIG. 15 is a flowchart illustrating an example of a process for controlling the division into slices according to the second embodiment.

In step S301 illustrated in FIG. 15, the number of codes estimating section 203 estimates the number of codes (expected number of codes) in each MB at a time after the variable-length coding using data to be encoding at a time before the variable-length coding. The expected number of codes in each MB that has been estimated is output to the slice controlling section 204.

In step S302, the slice controlling section 204 accumulates, using the following expression (10), the expected number of codes that has been obtained.

$$\text{sum\_bit} = \text{Expected number of codes in MB} \quad \text{Expression (10)}$$

"sum_bit" is a cumulative value of the expected number of codes and reset to 0 when processing of a picture begins.

In step S303, the slice controlling section 204 corrects the cumulative value sum_bit using the error in the number of codes obtained from the variable-length coding unit 202.

In step S304, the slice controlling section 204 judges whether or not the corrected cumulative value sum_bit has exceeded the threshold value Th_bit. If the corrected cumulative value has exceeded the threshold value (YES in step S304), the process proceeds to step S305. If the corrected cumulative value is equal to or smaller than the threshold value (NO in step S304), processing of a next MB begins.

In step S305, the slice controlling section 204 controls the division into slices such that an MB following the MB with which the threshold value has been exceeded belongs to a next slice. At this time, sum_bit is reset to 0.

As described above, according to the second embodiment, by correcting the cumulative value of the expected number of codes using the error between the actual number of codes and the expected number of codes, it is possible to perform the division into slices such that the actual number of codes becomes more even.

Next, a modification will be described. For example, an image encoding device has a plurality of modes as CPB modes. The CPB modes include, for example, a high-definition mode, an intermediate mode, and a small-delay mode.

In this case, the image encoding device sets the number of slices obtained as a result of the division and/or the group of picture (GOP) structure in accordance with the CPB mode. FIG. 16 is a diagram illustrating an example of the CPB modes. In the example illustrated in FIG. 16, the number of divisions is 1 and the GOP structure is the IBBP structure in the high-definition mode. In this mode, the quality of images has priority over delay.

In the intermediate mode, the number of divisions is 2 and the GOP structure is the IPPP structure. In this mode, delay may be reduced while deterioration of the quality of images is suppressed.

In the small-delay mode, the number of divisions is 4 and the GOP structure is the PPPP structure. Delay may be further reduced than in the intermediate mode while deterioration of the quality of images is suppressed.

Figure 17:
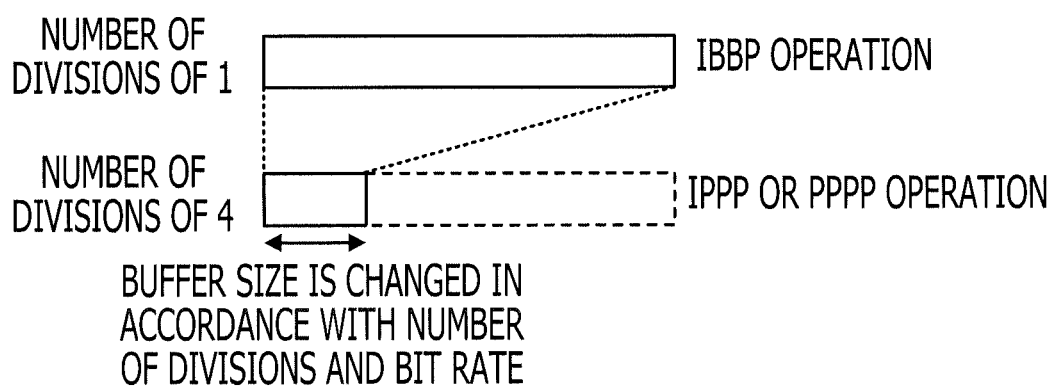
FIG. 17 is a diagram illustrating examples of the number of divisions and a picture structure.

FIG. 17 is a diagram illustrating examples of the number of divisions and the GOP structure. As illustrated in FIG. 17, when the number of divisions is 1, the image encoding device may be controlled such that processing is performed in the IBBP structure, in order to give the quality of images priority over delay.

When the number of divisions is 4, the buffer delay may be reduced by reducing the size of the buffer in the IPPP structure or the PPPP structure, in which pictures are not rearranged. Therefore, the GOP structure may be changed in accordance with the number of slices obtained as a result of the division. Once the number of slices obtained as a result of the division is determined in accordance with the CPB mode, a slice controlling section obtains the threshold value Th_bit on the basis of the number of divisions.

There is no particular relationship between the number of divisions and the GOP structure, and therefore other corresponding relationships may be adopted. FIGS. 18A and 18B are diagrams illustrating other examples of the CPB modes. In the CPB modes illustrated in FIG. 18A, the number of divisions is the same and the GOP structure is changed. Therefore, differences in the GOP structure correspond to differences in the CPB modes. In the CPB modes illustrated in FIG. 18B, the GOP structure is the same and the number of divisions is changed. Therefore, differences in the number of divisions correspond to differences in the CPB modes.

The size of the CPB is set to be larger than a capacity set in accordance with Th_bit. For example, the size of the CPB may be set in consideration of the number of codes used by header information and the DC coefficient, in order to avoid data corruption due to an overflow in the buffer.

With respect to the capacity of the CPB, when the encoding is assumed to be performed at 30 Mbps, a buffer capacity of at least 30 Mbit is used if the delay caused by the CPB is 1 second, or a buffer capacity of at least 15 Mbit is used if the delay caused by the CPB is 0.5 second. In the image encoding device, at least a CPB having a maximum bit rate is prepared, and a size of the CPB that is larger than this by a certain size may be set.

In an image encoding device having a maximum encoding rate of 100 Mbps, when the delay caused by the CPB is assumed to be 0.5 second, the size of the CPB is 50 Mbit. A memory having a sufficient capacity may be installed in the image encoding device, and the size of the CPB may be determined in accordance with the delay caused by the CPB.

Although the sequential processing is performed for each MB in the above-described embodiments, the sequential processing may be performed for each slice or picture. In addition to the encoding methods such as H.264 and H263, the above-described embodiments may adopt encoding methods in which division into slices is performed, such as MPEG-2 and MPEG-4.

The process for encoding an image described in the above-described embodiments may be realized as a program to be executed by a computer. By installing this program from a server or the like and causing the computer to execute the program, the above-described process for encoding an image may be realized.

Alternatively, it is also possible that the program is stored in a storage medium and the storage medium in which the program has been stored is read by a computer or a mobile terminal, in order to realize the above-described process for encoding an image. As the storage medium, any of various types of storage media may be used including storage media on which information is recorded optically, electrically, or magnetically, such as a compact disc read-only memory (CD-ROM), a flexible disk, and a magneto-optical disk, and semiconductor memories on which information is electrically recorded, such as a read-only memory (ROM) and a flash memory. Alternatively, the process for encoding an image described in each of the above embodiments may be realized by a single integrated circuit or a plurality of integrated circuits.

Figure 19:
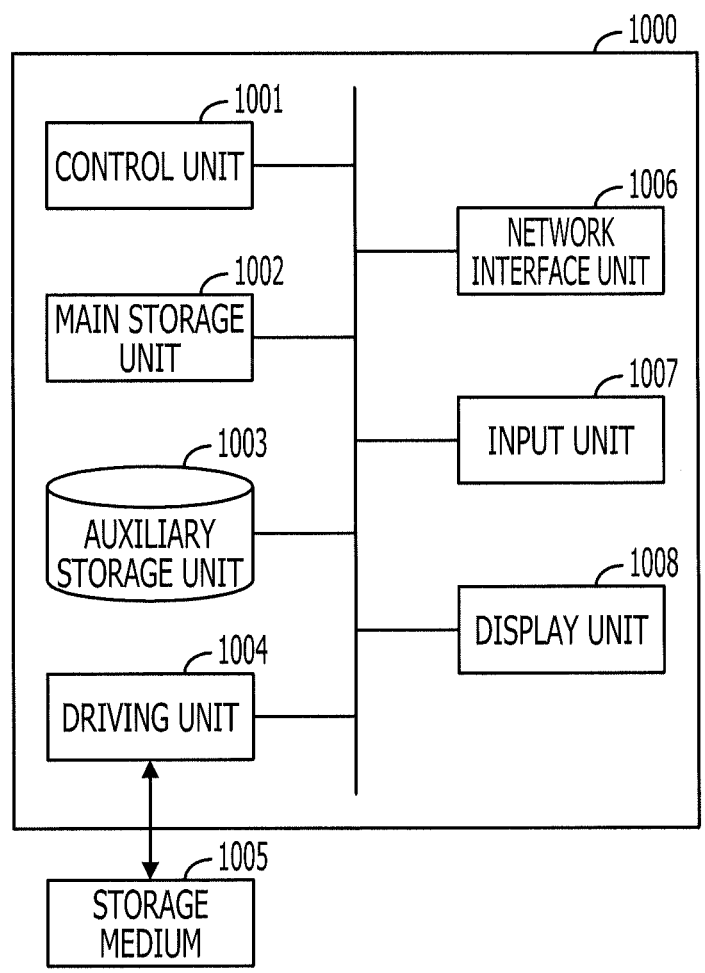
FIG. 19 is a diagram illustrating an example of the configuration of an image encoding device.

FIG. 19 is a diagram illustrating an example of the configuration of an image encoding device 1000. As illustrated in FIG. 19, the image encoding device 1000 includes a control unit 1001, a main storage unit 1002, an auxiliary storage unit 1003, a driving unit 1004, a network interface unit 1006, an input unit 1007, and a display unit 1008. These components are connected to one another through a bus in such a way as to enable transmission and reception of data.

The control unit 1001 is a central processing unit (CPU) that controls each component and calculates and processes data in a computer. In addition, the control unit 1001 is an arithmetic unit that executes programs stored in the main storage unit 1002 and the auxiliary storage unit 1003. The control unit 1001 receives data from the input unit 1007 and storage units, and outputs the data to the display unit 1008 and the storage units after calculating and processing the data.

The main storage unit 1002 is a ROM or a random-access memory (RAM) and is a storage unit that stores or temporarily saves programs and data of an operating system (OS), which is basic software executed by the control unit 1001, and application software.

The auxiliary storage unit 1003 is a hard disk drive (HDD) or the like and is a storage unit that stores data relating to the application software.

The driving unit 1004 reads a program from a storage medium 1005, which is, for example, a flexible disk, and installs the program in a storage unit.

The driving unit 1004 also stores a certain program in the storage medium 1005, and the program stored in the storage medium 1005 is then installed in the image encoding device 1000 through the driving unit 1004. The installed certain program may be executed by the image encoding device 1000.

The network interface unit 1006 is an interface between a peripheral device having a communication function connected through a network, such as a local area network (LAN) or a wide area network (WAN), constructed by data transmission paths such as a wire circuit and/or a wireless link and the image encoding device 1000.

The input unit 1007 includes a cursor key, a keyboard having numeric input keys, various function keys, and the like, a mouse and a trackpad for selecting a key on a display screen of the display unit 1008, and the like. In addition, the input unit 1007 is a user interface for allowing a user to issue operation instructions to the control unit 1001 and to input data.

The display unit 1008 is configured by including a cathode ray tube (CRT) and a liquid crystal display (LCD), and displays a screen according to display data input from the control unit 1001.

Thus, the process for encoding an image described in the above embodiments may be realized as a program to be executed by a computer. The above-described process for encoding an image may be realized by installing this program from a server or the like and causing the computer to execute the program.

In addition, it is also possible that the program is stored in the storage medium 1005 and the storage medium 1005 in which the program has been stored is read by a computer or a mobile terminal, in order to realize the above-described process for encoding an image. As the storage medium 1005, any of various types of storage media may be used including storage media on which information is recorded optically, electrically, or magnetically, such as a CD-ROM, a flexible disk, and a magneto-optical disk, and semiconductor memories on which information is electrically recorded, such as a ROM and a flash memory. Alternatively, the process for encoding an image described in each of the above embodiments may be realized by a single integrated circuit or a plurality of integrated circuits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image encoding device that encodes an image by performing sequential processing in units of a certain size, the image encoding device comprising:
   a processor; and
   a memory which stores a plurality of instructions, which when executed by the processor, cause the processor to execute:
   performing variable-length coding on data to be encoded having the certain size in the image;
   estimating the number of codes at a time after the variable-length coding using the data to be encoded at a time before the variable-length coding is performed by the performing; and
   controlling division of the image into slices on the basis of a cumulative value of the estimated number of codes.

2. The device according to claim 1,
wherein the controlling obtains an error between the number of codes of the data encoded by the performing and the estimated number of codes, and corrects the cumulative value using the obtained error.

3. The device according to claim 1,
wherein the estimating estimates the number of codes on the basis of magnitude of a motion vector included in the data to be encoded.

4. The device according to claim 1,
wherein the estimating estimates the number of codes on the basis of values of "run" and "level" of Discrete Cosine Transform coefficients at a time after quantization included in the data to be encoded.

5. The device according to claim 1,
wherein the estimating estimates, for Discrete Cosine Transform coefficients at a time after quantization included in the data to be encoded, the number of codes using a rate-distortion function of AC coefficients at a time after inverse quantization.

6. The device according to claim 1,
wherein the controlling calculates a threshold value using a bit rate, a picture rate, and the number of divisions, and performs control such that the division of the image into slices is performed when the cumulative value has exceeded the threshold value.

7. The device according to claim 1,
wherein the controlling determines the number of divisions in accordance with setting of a mode, which is selected from among modes including a high-definition mode and a small-delay mode.

8. A method for encoding an image in which the image is encoded by performing sequential processing in units of a certain size, the method comprising:
estimating, by a processor, the number of codes at a time after variable-length coding using data to be encoded having the certain size in the image at a time before the variable-length coding;
controlling division of the image into slices on the basis of a cumulative value of the estimated number of codes; and
performing the variable-length coding on the data to be encoded.

9. The method according to claim 8,
wherein, in the controlling, an error between the number of codes of the data encoded in the performing the variable-length coding unit and the estimated number of codes is obtained, and the cumulative value is corrected using the obtained error.

10. The method according to claim 8,
wherein, in the estimating, the number of codes is estimated on the basis of magnitude of a motion vector included in the data to be encoded.

11. The method according to claim 8,
wherein, in the estimating, the number of codes is estimated on the basis of values of "run" and "level" of Discrete Cosine Transform coefficients at a time after quantization included in the data to be encoded.

12. The method according to claim 8,
wherein, in the estimating, the number of codes is estimated, for Discrete Cosine Transform coefficients at a time after quantization included in the data to be encoded, using a rate-distortion function of AC coefficients at a time after inverse quantization.

13. The method according to claim 8,
wherein, in the controlling, a threshold value is calculated using a bit rate, a picture rate, and the number of divisions, and control is performed such that the division of the image into slices is performed when the cumulative value has exceeded the threshold value.

14. The method according to claim 8,
wherein, in the controlling, the number of divisions is determined in accordance with setting of a mode, which is selected from among modes including a high-definition mode and a small-delay mode.

15. A non-transitory computer-readable storage medium storing an image encoding program that encodes an image by performing sequential processing in units of a certain size and causes a computer to execute a process comprising:
estimating the number of codes at a time after variable-length coding using data to be encoded having the certain size in the image at a time before the variable-length coding;
controlling division of the image into slices on the basis of a cumulative value of the estimated number of codes; and
performing the variable-length coding on the data to be encoded.

16. The non-transitory computer-readable storage medium according to claim 15,
wherein, in the controlling, an error between the number of codes of the data encoded in the performing the variable-length coding unit and the estimated number of codes is obtained, and the cumulative value is corrected using the obtained error.

17. The non-transitory computer-readable storage medium according to claim 15,
wherein, in the estimating, the number of codes is estimated on the basis of magnitude of a motion vector included in the data to be encoded.

18. The non-transitory computer-readable storage medium according to claim 15,
wherein, in the estimating, the number of codes is estimated on the basis of values of "run" and "level" of Discrete Cosine Transform coefficients at a time after quantization included in the data to be encoded.

19. The non-transitory computer-readable storage medium according to claim 15,
wherein, in the estimating, the number of codes is estimated, for Discrete Cosine Transform coefficients at a time after quantization included in the data to be encoded, using a rate-distortion function of AC coefficients at a time after inverse quantization.

20. The non-transitory computer-readable storage medium according to claim 15,
wherein, in the controlling, a threshold value is calculated using a bit rate, a picture rate, and the number of divisions, and control is performed such that the division of the image into slices is performed when the cumulative value has exceeded the threshold value.

* * * * *